June 6, 1933.                D. D. ROSENBURGH                1,912,729
                              INDICATING DEVICE
                             Filed Sept. 18, 1931
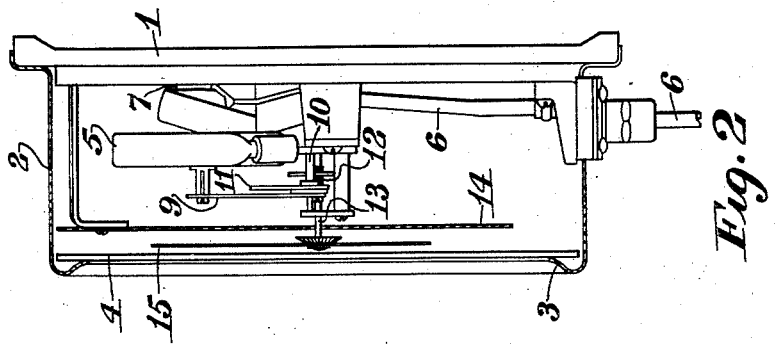
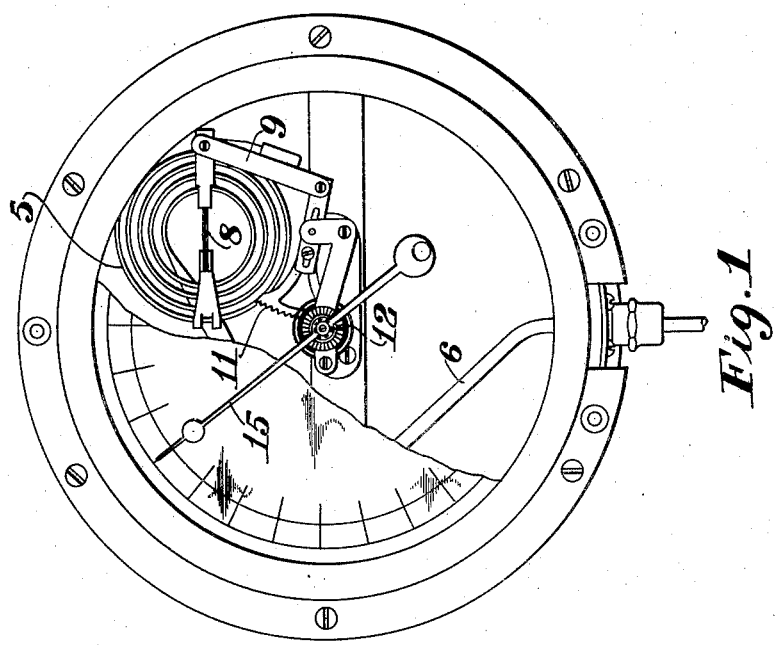
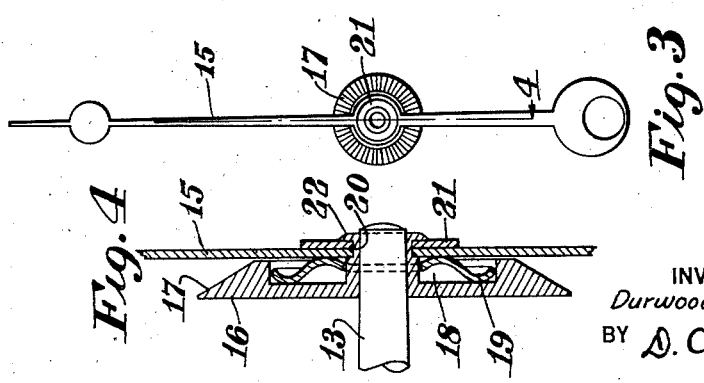
INVENTOR
*Durwood D. Rosenburgh*
BY D. Clyde Jones
ATTORNEY Patented June 6, 1933

1,912,729

UNITED STATES PATENT OFFICE

DURWOOD D. ROSENBURGH, OF ROCHESTER, NEW YORK, ASSIGNOR TO TAYLOR INSTRUMENT COMPANIES, OF ROCHESTER, NEW YORK, A CORPORATION OF NEW YORK

INDICATING DEVICE

Application filed September 18, 1931. Serial No. 563,548.

This invention relates to indicating devices having a movable pointer such as is employed in devices for indicating temperature, pressure and the like.

In the past it has been customary, when setting the pointer of such a device for zero reading, to adjust an operating arbor and its attached pointer, with respect to the actuating mechanism of the device. This adjustable mounting of the arbor, however, increased the cost of manufacturing said instruments, and also complicated the adjustment of the indicator, since it was necessary to change the relation between the arbor and the actuating mechanism. Such an adjustment also necessitated the use of a tool to adjust the mechanism, all included within the casing of the device behind the dial thereof.

In accordance with the present invention, a novel arrangement is provided in an indicating device for adjusting the index or pointer with respect to the arbor on which it is mounted, whereby the adjustable parts are so positioned that it is unnecessary to disturb the actuating mechanism of the pointer. Another feature of the invention comprises means in front of the dial of an indicating device whereby the arbor may be held in fixed position while the pointer, which is frictionally held thereon, may be adjusted.

These and other features of the invention will appear from the detailed description and claim when taken with the drawing in which Fig. 1 is a front view of an indicating device incorporating the present invention, in which device a portion of the dial is broken away to indicate more clearly the operating mechanism of the pointer; Fig. 2 is a side view with a portion of the case broken away; Fig. 3 is a top view of a pointer and its mounting; and Fig. 4 is a sectional view of the pointer taken on the line 4—4 of Fig. 3.

While the present invention is not limited to any specific type of indicating device, the instrument represented in Figs. 1 and 2 show one particular application of the invention. The indicating device herein disclosed, comprises a base 1, operating mechanism supported thereon and an annular casing 2 surrounding the mechanism, the front end of which casing is closed by a glass 4 held in place by means including flange 3. On the base there is mounted a Bourdon spring generally designated 5, which spring is actuated in the well known manner by changes in fluid or vapor pressure within a capillary 6, attached to a bulb (not shown) which is exposed to changing conditions to be indicated. It will be noted that one end of this capillary terminates at one end of the Bourdon spring 5, which end of this spring is preferably mounted on the base 1, as shown at point 7. The other or free end of this spring is fastened to a link 8 pivoted to one end of the bell crank lever 9 which is pivoted on the pin 10. On the other arm of the bell crank lever, there is secured a segment gear 11 which engages a pinion 12 mounted on a rotatable arbor 13, extending through a central opening in the graduated dial plate 14. It should be noted that the free end of the arbor is gradually tapered. On the end of the arbor extending through the dial, there is mounted a pointer 15 which is movable over the graduations on the dial in accordance with the movements of the arbor as actuated by the operating mechanism within the casing. This operating mechanism, just described, is well-known and is described for the purpose of giving a proper background for describing the present invention. It will be understood that the indicating mechanism may employ either a Bourdon spring or a capsular diaphragm, as occasion demands.

Prior to applicant's invention, it has been customary to fix the pointer 15 on the arbor permanently and when it was desired to adjust the pointer to give the proper zero reading, it was necessary to adjust the axial position of the arbor in order to change the adjustment of the pointer.

In accordance with the present invention, it is proposed to adjust the position of the pointer relative to the arbor without injuring the actuating mechanism of the device. In order to achieve this result, there is driven on the tapered arbor to give a relatively fixed mounting, a circular disk 16 having its top face 17 beveled and knurled. In the top surface of this disk there is provided an annular recess 18, defining a hub provided with a shoulder. One surface of the pointer 15 engages this shoulder and the other surface of the pointer engages a washer 21, which is held on the hub by the upset flange 22 thereof. A spring 19 of corrugated contour engages the bottom of the recess and the under surface of the pointer 15, to hold the same in frictional engagement with the washer 21. When it is desired to adjust the pointer 15 with respect to the zero setting on the dial scale, the casing is removed and the knurled disk 16 is grasped to hold the arbor 13 in relatively fixed position, at the same time the pointer 15 is moved frictionally on disk of the arbor to a proper zero setting.

The present disclosure is merely typical of applicant's invention, and it will be understood that there may be variations and modifications thereof within the scope of the claim, without departing from the present invention.

I claim:

In a device of the character described, a rotatable arbor, means for rotating the same, a member secured on the end of said arbor, said member being provided with an annular recess defining a hub, a pointer mounted on said hub, means including a washer for holding said pointer on said hub, and a spring in said recess for holding said pointer in frictional engagement with said washer.

In testimony whereof I affix my signature.

DURWOOD D. ROSENBURGH.